3,017,399
PRODUCTION OF VINYL CHLORIDE POLYMERS
Robert S. Holdsworth, Needham, and William Mayo Smith, Wellesley Hills, Mass., assignors to Escambia Chemical Corporation, Pace, Fla., a corporation of Delaware
No Drawing. Filed May 16, 1958, Ser. No. 735,694
8 Claims. (Cl. 260—92.8)

This invention relates to the production of polymers and copolymers of vinyl halides.

A principal object of the present invention is to provide a process for producing polymer beads having an unusually large particle size.

Another object of the invention is to provide polymer beads of a substantially uniform particle size.

Other objects of the invention will in part be obvious and will in part appear hereinafter.

The invention accordingly comprises the process involving the several steps and the relation and the order of one or more of such steps with respect to each of the others which are exemplified in the following detailed disclosure and the scope of the application of which will be indicated in the claims.

For a fuller understanding of the nature and objects of the invention reference should be made to the following detailed description.

Heretofore, the polymer particles produced by suspension processes ranged in size from somewhat larger than those produced by emulsion processes to several hundred microns. The process of the present invention is particularly directed to the production of polymer beads which are of a generally large and uniform size.

The process of the present invention comprises polymerizing a vinyl halide at a pH below about 7.0 while dispersed in an aqueous medium containing a polyamine salt such as a diamine, triamine and the like, and a surface active agent selected from the group consisting of the salts of organic sulfonates and organic sulfates. The process of the present invention is particularly well adapted to the polymerization of vinyl chloride. The process is also applicable to the polymerization of vinylidene chloride, and copolymerization of such monomers as vinyl chloride with a vinyl ester, or an allyl ester or an ester of maleic or fumaric acids.

The present invention is the first to describe, recognize and appreciate the fact that certain amines, when used in conjunction with certain surface active agents at a low pH in a suspension polymerization of certain vinyl compounds, result in the production of substantially uniform, large size polymer beads.

Specific detailed methods of practicing the present invention are set forth in the following non-limiting examples.

*Example I*

A mixture of 100 parts by weight of vinyl chloride, 200 parts of demineralized water, 0.2 part of lauroyl peroxide, 0.05 part of Ultrawet K (an alkyl benzene sodium sulfonate), and 0.2 part of ethylene diamine hydrochloride was charged to a 26-ounce glass bottle and polymerized with agitation for 16 hours at 50° C. The pH of the resulting suspension was about 3.8 and a conversion of 93 percent was obtained. The resin had a large, uniform particle size as follows:

Percent
Retained on 40 mesh screen ------------------- 99
Retained on 80 mesh screen ------------------- 1

*Example II*

Example I was repeated using ethylene diamine in place of the ethylene diamine hydrochloride. The pH of this run was 9.7 and a flocculated product resulted.

Example I was again repeated using ethylene diamine and sufficient hydrochloric acid to reduce the pH to 7 or lower. A product having large, bead-like particles similar to Example I was then obtained. The pH of the polymerization system must be 7 or lower to produce the desired product.

*Example III*

Polymerizations similar to Example I were run with the diamine hydrochloride replaced by monoamine hydrochlorides such as ethyl amine hydrochloride, diethylamine and triethanolamine hydrochlorides. In each of these runs, a flocculated or agglomerated product resulted. Thus a di- or a polyamine is required to produce the desired product.

*Example IV*

In this example, the diamine was omitted and the reaction mixture consisted of only 100 parts by weight of vinyl chloride, 200 parts of demineralized water, 0.2 part lauroyl peroxide and 0.05 part Ultrawet K. The polymerization was carried out at 50° C. for 16 hours in the same manner as described in the above example. A flocculated or agglomerated product resulted.

Several additional runs were then carried out systematically varying the wetting agent from 0.05 to 3.00 parts per 100 parts of vinyl chloride. In all cases, only agglomerated products were obtained thus showing that the wetting agent alone was not sufficient to produce the desired large size polymer beads.

*Example V*

Polymers having the same large, uniform particle sizes as in Example I were prepared from 100 parts vinyl chloride, 200 parts of demineralized water, 0.2 part lauroyl peroxide, 0.1 part Ultrawet 60–L (alkyl benzene triethanol sulfonate) and the following polyamine-acid combinations:

TABLE 1

| Amine | Amount | Acid | Amount | pH | Particle Size |
|---|---|---|---|---|---|
| Ethylene Diamine | 0.1 | $H_3PO_4$ | 0.2 | 6.6 | Large. |
| Diethylene Triamine | 0.1 | $H_3PO_4$ | 0.2 | 4.0 | Do. |
| Tetraamine Pentamine | 0.1 | HCl | 0.2 | 3.6 | Do. |
| Aminoethyl Ethanolamine | 0.1 | HCl | 0.2 | 3.1 | Do. |
| Hexamethylene Diamine | 0.1 | HCl | 0.2 | 3.6 | Do. |

As clearly illustrated in the examples, the present invention produces substantially uniform, large size polymer beads which are chemically and physically homogeneous. This is achieved only by the use in combination of a novel stabilizing system and a pH below 7.0. The particle size is larger than conventional and the polymer beads process easily since they readily absorb plasticizer when preblended at room temperature to yield a dry mixture, which has excellent flow properties.

In addition, the polymer beads are dust free and handling losses are low when compared with conventional, dust-like or powder resins. The large size polymer beads present fewer fabrication problems, whereas the fine powdery type presents many difficulties.

The stabilizing system is comprised of (a) a surface-active agent selected from the group consisting of the salts of organic sulfonates and organic sulfates, (b) an amine such as the diamines, triamines, tetramines, pentamines and the like and (c) sufficient acid to yield a pH of 7.0 or lower. In general, it is found that the anionic surface-active agents, such as organic sulfate or sulfonate salts, are more desirable to use with the selected amine to produce the desired polymer beads.

Examples of suitable surface-active agents include high molecular weight sulfate salts and mono- and dialkyl substituted-aryl hydrocarbons such as the alkyl naphthalene sulfonic acids, diiosbutyl naphthalene sodium sulfonate, decyl benzene sodium sulfonate, sodium disulfonate of dibutyl phenyl phenol, isopropyl naphthalene sodium sulfonate, dioctyl sodium sulfosuccinate, sodium lauryl sulfate, sodium tetradecyl sulfate, sodium pentadecyl sulfate, sodium octyl sulfate, as well as others of the above type which are well known. In place of sodium other salts may be used, for example, the potassium, ammonium or lithium salts. The amount of surface active agent used is desirably maintained between about 0.01 to about 1.0 part of every 100 parts of monomer employed.

In addition to the surface-active agent, the polymerization stabilizing system also comprises a polyamine preferably selected from the group consisting of diamines triamines, tetramines and pentamines. Examples for suitable organic amines are ethylene diamine, propylene diamine, diethylene triamine, triethylene tetramine, tetraethylene pentamine, hexamethylene diamine and the like. As used in the specification and claims the term "polyamine" will include within its meaning diamines as well as triamines, tetramines, pentamines and other compounds containing a greater number of amino groups. Such polyamines can contain other functional groups such as hydroxyl, keto and the like. The combination of a preferred amine with a salt of an organic sulfate or sulfonate at pH of 7.0 or below results in an entirely novel type of stabilizing system for vinyl polymerization. The production of a resin with large, uniform particle size is obtained by a careful control of the amounts of each component of the stabilizing system. The amount of amine used is desirably maintained between about 0.01 and about 1.0 part for every 100 parts of monomer employed.

Not only must the above-mentioned stabilizing system be employed to obtain the desired size polymer beads, but also the polymerization must be carried out at a pH below 7.0. Polymerizations carried out at pH above about 7.0, even in the presence of the preferred stabilizing system, resulted in agglomerated resins. For purposes of adjusting the pH of the polymerization system, such acids as phosphoric, acetic, hydrochloric, sulfuric, oxalic, chloroacetic and the like can be used.

Polymerization temperatures of between about 30° C. and 70° C. have been found to be most suitable. The polymerization time varies considerably depending upon such factors as the temperatures employed, catalysts, amount of catalyst, etc. The polymerization is generally continued until substantially complete or until more than about 80% of the monomer or monomers are converted to polymer or copolymers. The completion of the polymerization is indicated by a pressure drop in the reactor. The reaction times are usually in excess of 12 hours when conducted at 50° C. The pressure must be sufficient to maintain the polymerizable compounds in the liquid phase while dispersed in the aqueous medium.

Organic peroxides, azo compounds, redox systems and the like can be used in the process as catalysts. Suitable organic peroxides are lauroyl peroxide, benzoyl peroxide, chlorobenzoyl peroxide, capryl peroxide, myristyl peroxide, acetyl peroxide, stearoyl peroxide, acetylbenzoyl peroxide, tertiary butyl hydroperoxide, phthalyl peroxide, succinyl peroxide and the like. Good results are obtained when between about 0.05 to about 0.5 part of catalyst is used per 100 parts of monomer. The polymerization is carried out in a liquid which is immiscible with the polymerizable compounds, i.e., the liquid medium is a non-solvent for the monomer or monomers to be polymerized. Water is the preferred suspension medium. The amount of water in which the polymerization is to be effected is preferably maintained between about 1.5 to 5 times the weight of monomer used. The suspension is agitated or stirred during the polymerization. While the polyvinyl polymer beads will settle out on termination of the agitation, the suspension is usually pumped as a slurry for filtration or centrifugation to separate the polymer beads from the aqueous medium. The recovered beads can then be washed with water if desired and then dried.

The present process is applicable to the polymerization of vinyl halides especially vinyl chloride. The process is also applicable to the polymerization of other monomers such as vinylidene chloride and to the copolymerization of vinyl chloride with up to 20 percent by weight of such compounds as vinyl esters, allyl esters, esters of maleic acid and fumaric acids.

As illustrated in the examples, over 90% of the produced polymer was retained on screens of 80 mesh or coarser. This clearly illustrates the large particle size of the polymer. The range of particle size is quite narrow and not extended over a wide range as found in the prior art.

Since certain changes may be made in the above process without departing from the scope of the invention herein involved, it is intended that all matter contained in the above description should be interpreted as illustrative and not in a limiting sense.

What is claimed is:

1. The process of producing substantially uniform, large particle size polyvinyl chloride beads, of a size of at least 80 mesh, which consists in polymerizing a monomer comprising vinyl chloride at a temperature between about 30° C. and 70° C. and at a pH below about 7.0 while suspended in an aqueous suspension medium consisting essentially of an oil-soluble free radical polymerization catalyst, an alkylene polyamine and a surface-active agent selected from the group consisting of organic sulfates and organic sulfonates, said polyamine and said surface-active agent each being present in an amount within the range of about 0.01 to about 1.0 part per 100 parts of vinyl chloride.

2. The process of producing substantially uniform, large particle size polyvinyl chloride beads which consists in polymerizing a monomer comprising vinyl chloride at a temperature between about 30° C. and 70° C. and at a pH below about 7.0 while suspended in an aqueous suspension medium consisting essentially of an oil-soluble free radical polymerization catalyst, an alkylenediamine and a surface-active agent selected from the group consisting of organic sulfates and organic sulfonates, said diamine and said surface-active agent each being present in an amount within the range of about 0.01 to about 1.00 part per 100 parts of vinyl chloride.

3. The process of producing substantially uniform, large size polyvinyl chloride beads which consists in polymerizing a monomer comprising vinyl chloride at a temperature between about 30° C. and 70° C. and at a pH below about 7.0 while suspended in an aqueous suspension medium consisting essentially of an oil-soluble free radical polymerization catalyst, an alkylenetriamine and a surface-active agent selected from the group consisting of organic sulfates and organic sulfonates, said triamine and said surface-active agent each being present in an amount within the range of about 0.01 to about 1.00 part per 100 parts of vinyl chloride.

4. The process of producing substantially uniform, large size polyvinyl chloride beads which consists in polymerizing a monomer comprising vinyl chloride at a temperature between about 30° C. and 70° C. and at a pH below about 7.0 while suspended in an aqueous suspension medium consisting essentially of an oil-soluble free radical polymerization catalyst, an alkylenetetramine and a surface-active agent selected from the group consisting of organic sulfates and organic sulfonates, said tetramine and said surface-active agent each being present in an amount within the range of about 0.01 to 1.00 part per 100 parts of vinyl chloride.

5. The process of producing substantially uniform, large size polyvinyl chloride beads which consists in polymerizing a monomer comprising vinyl chloride at a temperature between about 30° C. and 70° C. and at a pH below about 7.0 while suspended in an aqueous suspension medium consisting essentially of an oil-soluble free radical polymerization catalyst, an alkylenepentamine and a surface-active agent selected from the group consisting of organic sulfates and organic sulfonates, said pentamine and said surface-active agent each being present in an amount within the range of about 0.01 to about 1.00 part per 100 parts of vinyl chloride.

6. The process of producing substantially uniform, large particle size polyvinyl chloride beads which consists in polymerizing a monomer comprising vinyl chloride at a temperature between about 30° C. and 70° C. and at a pH below about 7.0 while suspended in an aqueous suspension medium consisting essentially of an oil-soluble free radical polymerization catalyst, an alkylenepolyamine and a salt of an organic sulfate as the surface-active agent, said polyamine and said surface-active agent each being present in an amount within the range of about 0.01 to about 1.00 part per 100 parts of vinyl chloride.

7. The process of producing substantially uniform, large particle size polyvinyl chloride beads which consists in polymerizing a monomer comprising vinyl chloride at a temperature between about 30° C. and 70° C. and at a pH below about 7.0 while suspended in an aqueous suspension medium consisting essentially of an oil-soluble free radical polymerization catalyst, an alkylenepolyamine and a salt of an organic sulfonate as a surface-active agent, said polyamine and said surface-active agent being present in an amount within the range of about 0.01 to about 1.00 part per 100 parts of vinyl chloride.

8. The process of producing substantially uniform, large particle size polyvinyl chloride beads which consists in polymerizing a monomer comprising vinyl chloride at a temperature between about 30° C. and 70° C. and at a pH below about 7.0 while suspended in an aqueous suspension medium consisting essentially of an oil-soluble free radical polymerization catalyst, an alkylenepolyamine and an anionic surface-active agent selected from the group consisting of salts of organic sulfates and organic sulfonates, said polyamine and said anionic surface-active agent each being present in an amount within the range of about 0.01 to about 1.0 part per 100 parts of vinyl chloride.

References Cited in the file of this patent
UNITED STATES PATENTS

| | | |
|---|---|---|
| 2,604,468 | Underwood et al. | July 22, 1952 |
| 2,694,053 | Uraneck et al. | Nov. 9, 1954 |